US012278879B2

(12) United States Patent
Johnston et al.

(10) Patent No.: US 12,278,879 B2
(45) Date of Patent: Apr. 15, 2025

(54) PREDICTING FUTURE NETWORK ISSUES FOR USERS WITH DIGITAL MODEL PERSONAS

(71) Applicant: Cisco Technology, Inc., San Jose, CA (US)

(72) Inventors: Jay Kemper Johnston, Raleigh, NC (US); David C. White, Jr., St. Petersburg, FL (US); Jeffrey Dominick Jackson, Holly Springs, NC (US); Magnus Mortensen, Cary, NC (US); Matthew R. Engle, Plano, TX (US); Ryan Alan MacLennan, Durham, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/975,199

(22) Filed: Oct. 27, 2022

(65) Prior Publication Data

US 2024/0146824 A1 May 2, 2024

(51) Int. Cl.
*H04L 67/60* (2022.01)
*G06F 9/50* (2006.01)
(Continued)

(52) U.S. Cl.
CPC ............ *H04L 67/60* (2022.05); *G06F 9/5044* (2013.01); *H04L 67/306* (2013.01); *H04L 67/75* (2022.05)

(58) Field of Classification Search
CPC ... H04L 67/306; H04L 41/147; H04L 67/535; H04L 47/823; H04L 41/145;
(Continued)

(56) References Cited

U.S. PATENT DOCUMENTS

2008/0172461 A1 7/2008 Thattai et al.
2013/0178195 A1* 7/2013 Luna ..................... H04W 4/00
455/414.1

(Continued)

FOREIGN PATENT DOCUMENTS

EP 3111358 B1 * 11/2021 .......... G06F 11/3024

OTHER PUBLICATIONS

Justin Cranshaw, "Calendar.help: Designing a Workflow-Based Scheduling Agent with Humans in the Loop" Mar. 24, 2017, arXiv: 1703.08428, pp. 1-12 (Year: 2017).*

(Continued)

*Primary Examiner* — Rachel J Hackenberg
(74) *Attorney, Agent, or Firm* — Edell, Shapiro & Finnan, LLC

(57) ABSTRACT

A network management system tests the availability of a network resource before a user performs a task with the network resource. The system measures network activity of a user performing one or more tasks. The network activity includes communication between a user device of the user and each network resource associated with a corresponding task performed by the user. The system also generates a digital model persona of the user based on the tasks performed by the user, and determines a schedule of the tasks performed the user. Each particular task is associated with a corresponding execution time for the user. The system further configures the digital model persona to test the network resource associated with each corresponding task at a testing time that is a predetermined length of time prior to the execution time for the user.

20 Claims, 11 Drawing Sheets

(51) Int. Cl.
*H04L 67/306* (2022.01)
*H04L 67/75* (2022.01)

(58) Field of Classification Search
CPC ............. H04L 63/1425; H04L 41/5009; H04L 43/0876; H04L 67/75; H04L 67/60; H04L 67/54; G06F 9/5044; G06F 18/00
See application file for complete search history.

(56) References Cited

U.S. PATENT DOCUMENTS

| | | | |
|---|---|---|---|
| 2015/0012467 A1 | 1/2015 | Greystoke et al. | |
| 2016/0071157 A1 | 3/2016 | Crawford et al. | |
| 2016/0314302 A1* | 10/2016 | Sabetta | G06F 21/577 |
| 2017/0140285 A1* | 5/2017 | Dotan-Cohen | G06F 9/453 |
| 2018/0165593 A1* | 6/2018 | Stolarz | G06N 7/01 |
| 2018/0300376 A1 | 10/2018 | Yin et al. | |
| 2019/0138333 A1 | 5/2019 | Deutsch et al. | |
| 2019/0138662 A1 | 5/2019 | Deutsch et al. | |
| 2020/0104170 A1* | 4/2020 | Else | G06F 9/4887 |
| 2020/0186378 A1* | 6/2020 | Six | H04L 41/22 |
| 2020/0279556 A1* | 9/2020 | Gruber | H04M 1/6091 |
| 2021/0109837 A1 | 4/2021 | Rakshit | |
| 2021/0357827 A1 | 11/2021 | Cella et al. | |
| 2022/0108262 A1 | 4/2022 | Cella et al. | |
| 2022/0284340 A1* | 9/2022 | Choudhary | G06N 20/10 |

OTHER PUBLICATIONS

Flowmon, Network Operations, "Network Forecasting and Capacity Planning," https://www.flowmon.com/en/solutions/network-and-cloud-operations/network-capacity-planning, retrieved Jul. 6, 2022, 6 pages.

LogicMonitor, "Network Management & Monitoring," Retreived from https://www.logicmonitor.com/lp/network-management-monitoring, on Jul. 6, 2022, 4 pages.

* cited by examiner

| DIGITAL MODEL PERSONA | | USER |
|---|---|---|
| ACTIVITY / TASK | TIME | ACTIVITY / TASK |
| ACCESS EMAIL (SERVER A) SERVER A UNAVAILABLE | 7:30 AM | |
| ACCESS INTERNAL MESSAGES (SERVER B) | 8:00 AM | READ EMAIL (SERVER A) |
| ACCESS LOG FILES (SERVER C) | 8:30 AM | READ INTERNAL MESSAGES (SERVER B) |
| | 9:00 AM | REVIEW LOG FILES (SERVER C) |
| | 9:30 AM | |
| | 10:00 AM | READ EMAIL (SERVER A) |
| ACCESS CODE REPOSITORY (SERVER D) | 10:30 AM | |
| | 11:00 AM | ACCESS CODE REPOSITORY (SERVER D) |
| | 11:30 AM | |
| | 12:00 PM | |

FIG.4B

| DIGITAL MODEL PERSONA | | USER |
|---|---|---|
| ACTIVITY / TASK | TIME | ACTIVITY / TASK |
| ACCESS EMAIL (SERVER A) SERVER UNAVAIABLE | 7:30 AM | |
| ACCESS INTERNAL MESSAGES (SERVER B) | 8:00 AM | |
| ACCESS LOG FILES (SERVER C) | 8:30 AM | READ INTERNAL MESSAGES (SERVER B) COMPLETE |
| ACCESS EMAIL (SERVER A) SERVER A RESTORED | 9:00 AM | REVIEW LOG FILES (SERVER C) IN PROGRESS |
| | 9:30 AM | READ EMAIL (SERVER A) |
| | 10:00 AM | READ EMAIL (SERVER A) |
| ACCESS CODE REPOSITORY (SERVER D) | 10:30 AM | |
| | 11:00 AM | |
| | 11:30 AM | ACCESS CODE REPOSITORY (SERVER D) |
| | 12:00 PM | |

FIG.5B

PREDICTING FUTURE NETWORK ISSUES FOR USERS WITH DIGITAL MODEL PERSONAS

TECHNICAL FIELD

The present disclosure relates to tracking network activity of users, specifically to automatically testing network resources.

BACKGROUND

Monitoring the performance of network resources allows a network administrator to gather information about the utilization of the network. The network administrator may use this network utilization information for network capacity planning or optimization. Typical network monitoring systems gather information from network devices, and may trigger when loads meet or exceed a predetermined threshold. Alternatively, the network monitoring systems may perform an analysis of network issues after a device reports a performance issue.

BRIEF DESCRIPTION OF THE DRAWINGS

FIG. 4B illustrates the reconfigured schedule for a user after their digital model persona detects an outage of a network resource used for a task, according to an example embodiment.

FIG. 5B illustrates the reconfigured schedule for a user after their digital model persona detects the resumed availability of a network resource used for a task, according to an example embodiment.

DETAILED DESCRIPTION

Overview

Figure 1:
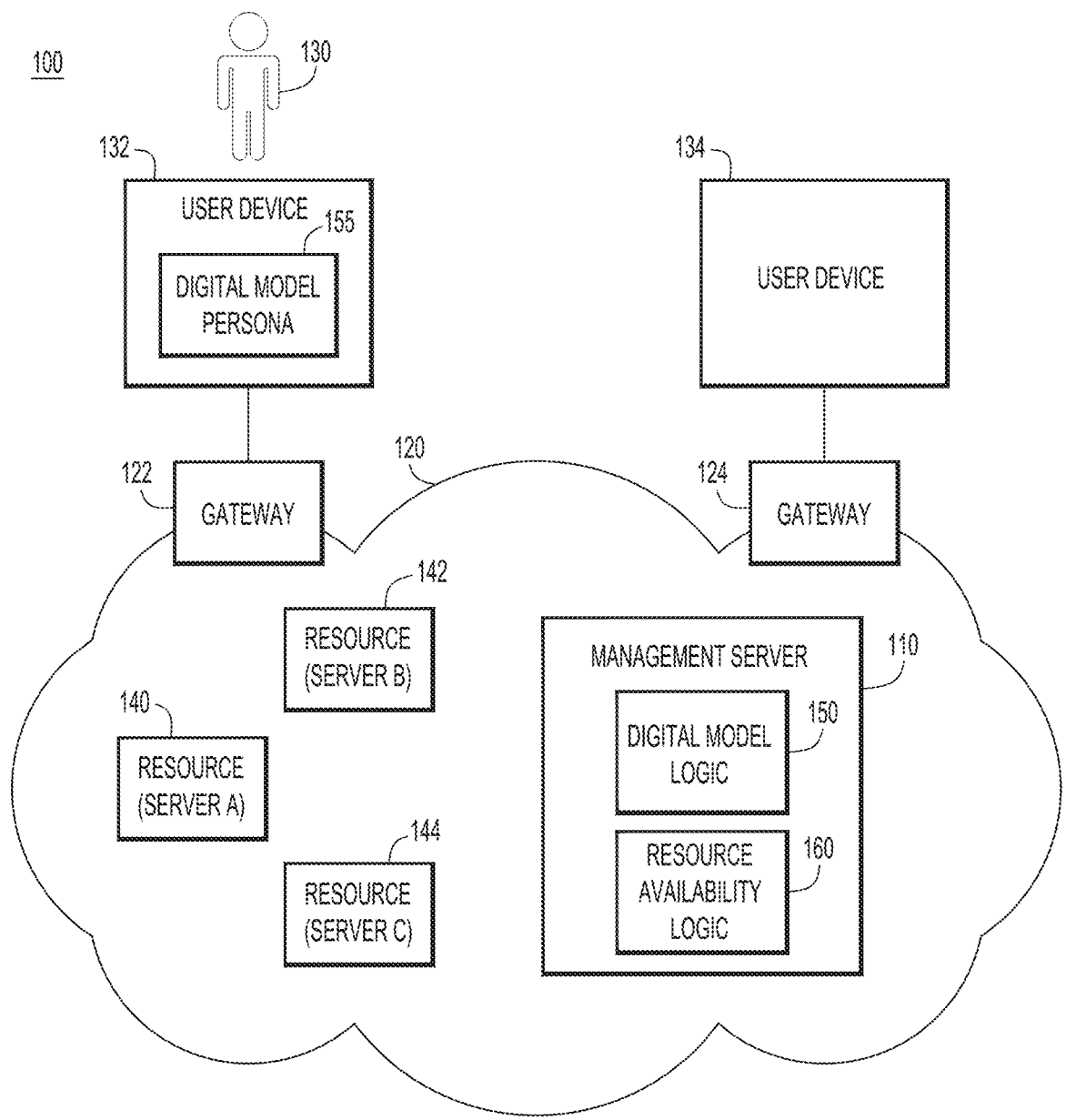
FIG. 1 is simplified block diagram of a network management system configured to monitor network activity of users, according to an example embodiment.

A computer-implemented method is provided to pre-test the availability of at least one network resource before a user performs a task with the at least one network resource. The method includes measuring network activity of a user performing one or more tasks. The network activity includes communication between a user device of the user and at least one network resource associated with a corresponding task of the one or more tasks performed by the user. The method also includes generating a digital model persona of the user based on the one or more tasks performed by the user. The method further includes determining a schedule of the one or more tasks performed by the user. Each particular task of the one or more tasks is associated with a corresponding execution time for the user. The method also includes configuring the digital model persona to test at least one network resource associated with the corresponding task at a testing time that is a predetermined length of time prior to the execution time for the user.

Example Embodiments

The techniques presented herein generate and leverage digital model personas of human users. An organization generates and associates a digital model persona for each human user with a network presence. The actions taken by the human user updates the digital model persona to enable the digital model persona to accurately reflect the network activity of the associated human user. In one example, the digital model persona mimics (e.g., is a duplicate record of) the activities of a human user, and the digital model persona may function as a digital twin of the human user.

As a human user performs network actions (e.g., entering data into a database, submitting a Return Merchandise Authorization (RMA), completing an order, creating a marketing presentation, etc.), a network management server with the digital model persona watches, records, and learns about the network activity of the human user. In one example, the digital model personas may test the availability of the end systems to ensure that the typical activities of a human user are operational. Additionally, the digital model personas may include all of the activities (e.g., filling out a web-based form) or the building blocks (e.g., connecting to a remote server) of the activities that the human user performs regularly.

The digital model personas simulate the behavior of real people and perform test actions based on the network behavior of human users. In one example, each digital model is based on the network behavior of a single, specific human user, such that the digital model persona acts as a digital twin of the human user. In another example, a digital model may be based on an amalgamation of the network behavior of multiple human users, who may share one or more traits. For instance, the network management system may generate a digital model to emulate the network behavior of users in a certain department (e.g., Human Resources (HR) or Engineering), a certain location (e.g., Germany offices, San Jose office, Building C, etc.), and/or a certain job title (e.g., administrative assistant, programmer, managing director, etc.).

The digital models used for digital model personas may be Machine Learning (ML) models leveraging on-machine, on-network, and offline log data to represent the network behavior of an endpoint controlled by a human user. An organization may use a network management system to consider the dimensions of the organizational structure, the physical location of users, and the network location of the user when constructing an ML model as a digital twin of a human user or group of users. Deploying an ML model as a digital model persona on the network generates network behavior that emulates the network activity of a human user. The network management system may place digital model personas at locations on the network for various organizational purposes, such as capacity testing or in anticipation of future growth.

Humans are creatures of habit, as evidenced by their daily routine (e.g., getting up, brushing teeth, drinking coffee, going to work, etc.). However, these habits may extend outside of the personal care arena and continue into their work life. For instance, in many organizations, most users look at emails (e.g., received outside of work hours) as their first activity in the morning. Other users may check their messages on an internal messaging platform or review voicemails before proceeding to other work activities (e.g., processing orders, checking a shipment status, reviewing production forecasts, etc.). Occasionally, a service may be unavailable (e.g., a server is down, network connectivity is lost, etc.), which prevents a user from accomplishing a task. The interruption in a typical user's routine may be frustrating, leading to the user simply waiting or stepping away, both of which cause a loss in productivity for the organization.

The techniques presented herein model each human user with a corresponding digital model persona that captures a detailed and accurate list of activities/tasks performed by the user, as well as the sequence in which the activities are performed. The digital model persona may pre-test the activity prior to the user attempting a task, and detect whether the resources for the task are available to the user. If the pre-test fails (e.g., due to a network/server outage), then the system may alert the user and suggest a re-ordering of the user's schedule, since their predicted task cannot be completed due to the outage.

Referring now to FIG. 1, a network management system 100 is configured to predict tasks and pre-test network activities for the tasks before a user attempts to perform those tasks. The system 100 includes a management server 110 and a network 120. The network 120 includes a gateway 122 and a gateway 124 that allow users to access network resources through the network 120. In one example, the network 120 may include multiple networks with additional network elements that are not depicted in FIG. 1 for simplicity.

A user 130 uses a user device 132 to access the network 120 through the gateway 122. A second user device 134 accesses the network 120 through the gateway 124. The second user device 134 may be assigned to a specific user (e.g., user 130) or available for any authorized user to access the network 120.

The network 120 includes network resources 140, 142, and 144. In one example, the network resources 140, 142, and/or 144 may be servers (e.g., servers A, B, and C) or a combination of network elements that connect servers to the gateway 122 or the gateway 124. In another example, the network resources 140, 142, and 144 may include application servers (e.g., email servers, web hosting servers, etc.), storage resources (e.g., network storage, databases, etc.), and/or communication resources (e.g., switches, routers, access points, etc.).

The management server 110 includes digital model logic 150 that enables the management server 110 to capture the network activity of the user 130 in a digital model persona 155. The digital model persona 155 may be deployed on the user device 132 to pre-test the network activity associated with tasks performed by the user 130 from the user device 132. Alternatively, the digital model persona 155 may be deployed in other locations, such as the gateway 122. The management server 110 also includes resource availability logic 160 that enables the management server 110 to track the availability of network resources (e.g., network resources 140, 142, and 144) that may be useful (or even required) for the user 130 to perform tasks.

The system 100 leverages the digital model personas (e.g., digital model persona 155) of human users (e.g., user 130). Each person with a network presence at an organization may be assigned a digital model persona, which learns the network activities of the corresponding user. The management server 110 may update each digital model persona based on the network activities taken by the corresponding user throughout the day or week. In one example, the intent of the digital model persona is to mimic (e.g., essentially duplicate) the activity of a human user. As the human user performs actions on the network (e.g., entering data in a database, submitting a Return Merchandise Authorization (RMA), completing a product order, generating a marketing presentation, etc.), the management server 110 is monitoring, recording, and/or learning those actions to update the corresponding digital model persona, so that the digital model persona may simulate those actions in the future. The digital model persona may then perform tests of the applicable network resources to ensure that the resources are available for those actions. The digital model persona may include all of the actions or building blocks of the tasks performed by the corresponding user on a daily basis.

Figure 2:
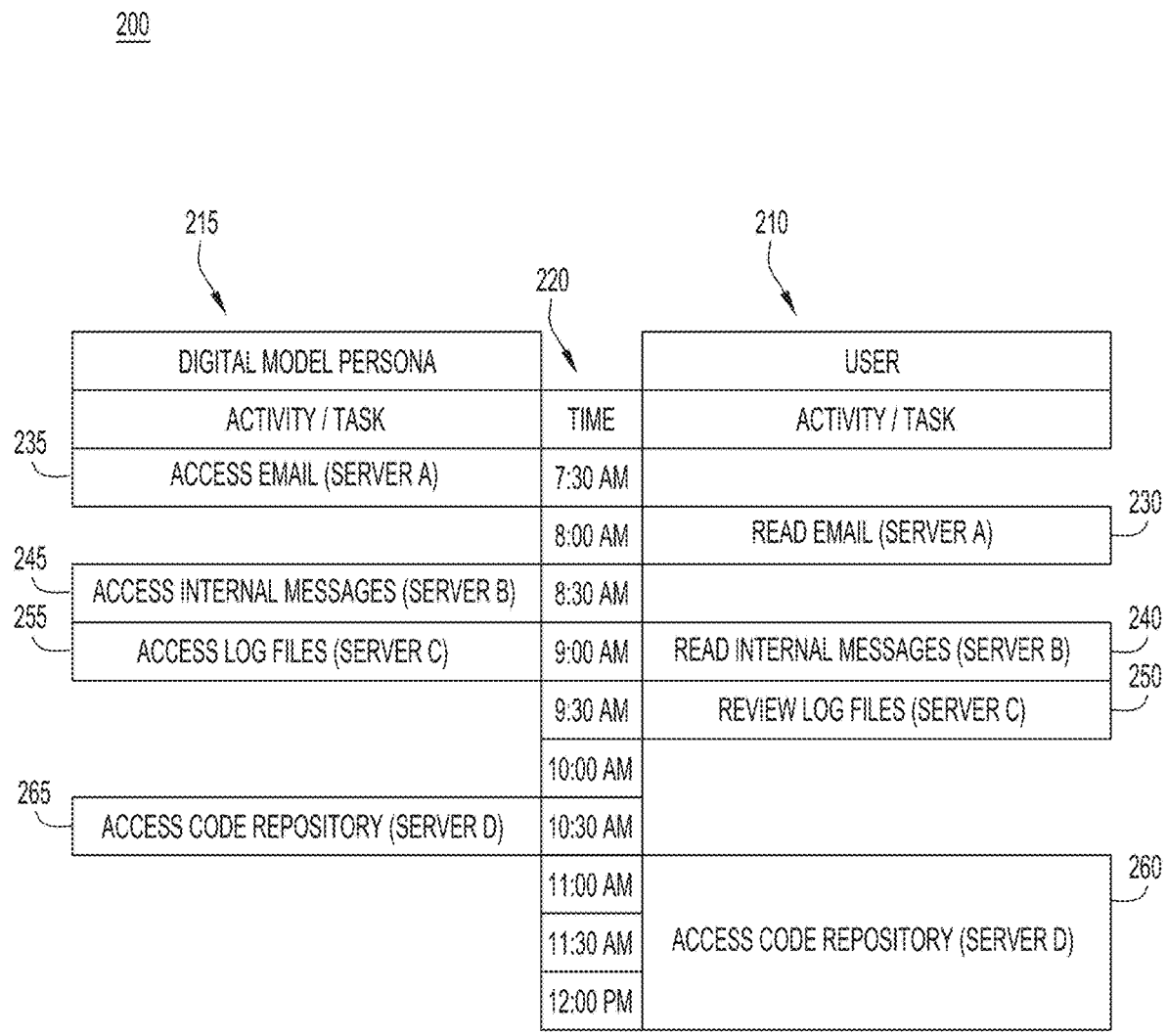
FIG. 2 illustrates a schedule for a digital model persona testing the availability of network resources before a user performs a task that uses the network resources, according to an example embodiment.

Referring now to FIG. 2, a schedule 200 includes a sequence 210 of tasks for a user to perform alongside a sequence 215 of pre-tests performed by a digital model persona corresponding to the user. The sequence 210 of user tasks and the sequence 215 of digital model persona pre-tests are shown against a common time column 220. The schedule 200 includes an initial task 230 (e.g., reading emails) that the user typically performs at 8:00 AM. In anticipation of the task 230, the digital model persona performs a pre-test 235 at 7:30 AM, i.e., a predetermined time before the user is expected to perform the task 230, to determine the availability of any network resources used to perform task 230.

The user is scheduled to perform a task 240 (e.g., reading internal messages on an instant messaging platform or other collaboration space) at 9:00 AM. The digital model persona performs a pre-test 245 at 8:30 AM to determine the availability of any network resources used to perform task 240. After performing the task 240, the user is scheduled to perform a task 250 at 9:30 AM. The digital model persona performs a pre-test 255 at 9:00 AM to determine the availability of any network resources used to perform the task 250. The user is scheduled to perform a task 260 at 11:00 AM. The digital model persona performs a pre-test 265 at 10:30 AM to determine the availability of any network resources used to perform the task 260.

In one example, the task 230 may be reading emails, which have arrived outside of the user's workday, as the first task to perform when the user arrives at work. The pre-test 235 may determine whether the email server is operational and whether the network connection between the user's device and the email server is working. In another example, the digital model persona may perform the pre-test 235 from a different device than the user's device. For instance, if the user's device is not connected to the network at 7:30 AM because the user has not arrived at the office yet, then the management server may instantiate the digital model persona on a different computing device, such as a gateway network device through which the user typically connects to the network. The digital model persona device may run the pre-test 235 from the gateway network device to determine whether the email server is operational and whether the network connection between the email server and the gateway network device is working.

In another example, the digital model persona may run the pre-tests at a testing time with a predetermined length of time before the user performs the corresponding task that is different than the thirty minutes shown in FIG. 2. In other words, the digital model persona may run a pre-test at a testing time that is closer or further from the expected execution time of the user task. For instance, the digital model persona may run the pre-test ten or fifteen minutes before the scheduled time of the user task. Additionally, the predetermined length of time between the testing time and the execution time may vary between different user tasks.

Figure 3:
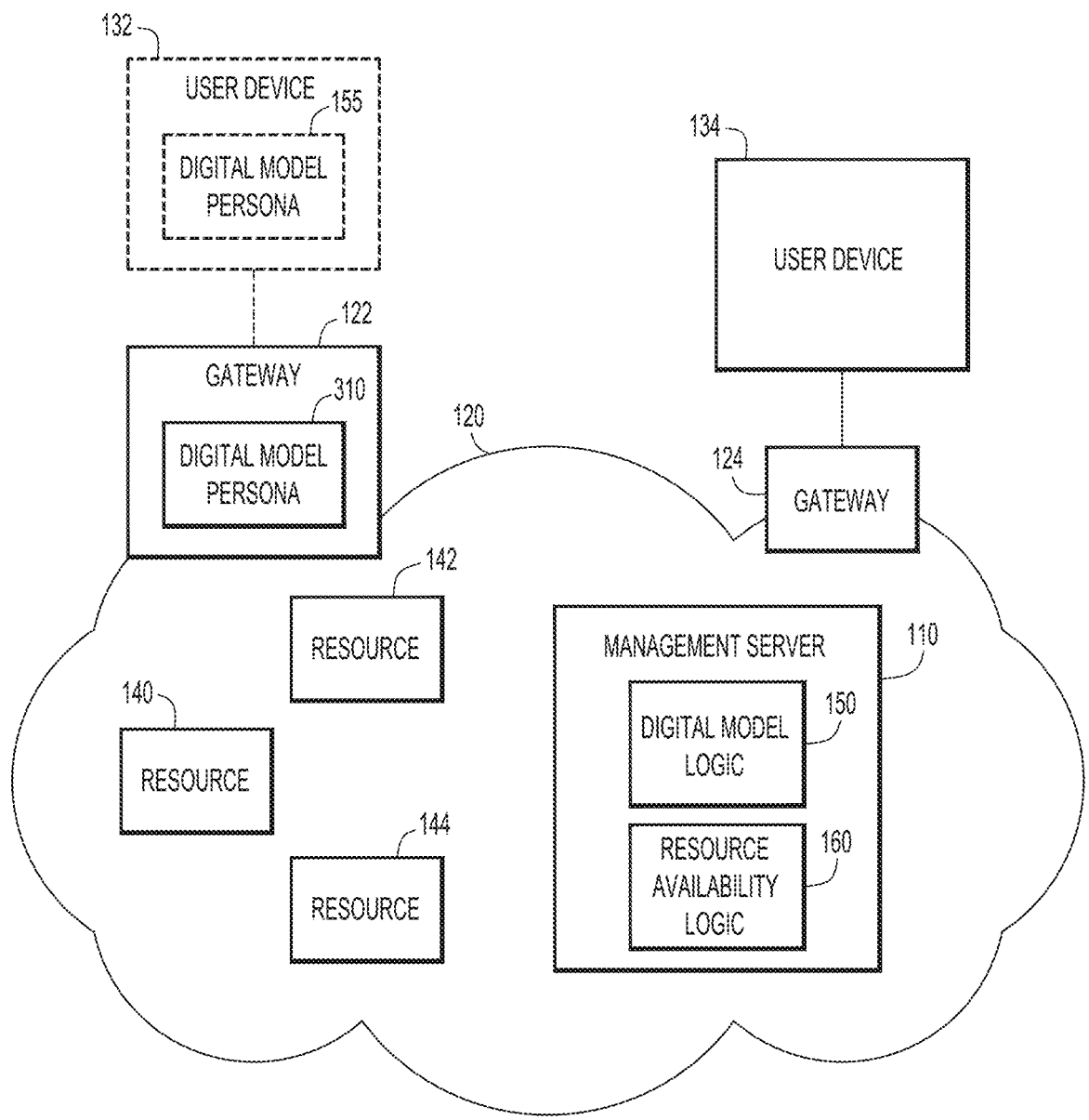
FIG. 3 is a simplified block diagram of the network management system instantiating a digital model persona at a gateway, according to an example embodiment.

Referring now to FIG. 3, a block diagram shows the digital model persona operating from a location other than the user device from which the corresponding user is scheduled to perform a task. If the user device 132 is not actively connected to the network 120 through the gateway 122, then the management server 110 may not be able to run the digital model persona 155 from the user device 132 to pre-test network resources before the user performs an associated task. In this instance, the management server 110 may instantiate the digital model persona 310 on the gateway 122. By running the digital model persona 310 on the gateway 122 to which the user device 132 typically connects, the digital model persona 310 is able to pre-test the network resources (e.g., network resources 140, 142, and/or 144) and a large portion of the network connection between the network resources and the user device 132 that will eventually perform the associated task.

In one example, the management server 110 may create a digital model persona of a human user's network presence in order to monitor and assess the availability of network resources that the human user is about to use, prior to the human user accessing the network resource. The management server 110 may cause the pre-tests of the digital model personas in the background, and provide notification of any service interruption of upcoming tasks that the corresponding user is predicted to perform. The management server 110 may provide a suggestion to the user to re-order the schedule of tasks performed by the user to circumvent the service disruption until such time that the service becomes available again.

In another example, the digital model persona 310 may pre-test all of the network resources that the corresponding user is expected to use for the morning or for the entire day. Additionally, the digital model persona 310 or the digital model persona 155 may pre-test the network resources again a predetermined amount of time (e.g., a few minutes) before the user typically performs each associated task. If the digital model persona 310 or the digital model persona 155 detect that a network resource is unavailable, then the management server 110 may notify the user through the user device 132. The management server 110 may provide suggestions to the user about when or how to perform a task when an associated network resource is unavailable.

In a further example, the digital model persona may be deployed as close to the human user as possible, but migrate around the network opportunistically when appropriate. For instance, during the day when the user 130 is accessing the network 120 with the user device 132, the digital model persona 155 may be run on the user device 132 (e.g., as a containerized entity alongside the user). When the user 130 turns off the user device 132 for the night, the digital model persona 155 may be migrated to the digital model persona 310 on the gateway 122. In other words, the container with the digital model persona may be moved to the closest access point to the network 120 and continue operating.

Additionally, the management server 110 may migrate the digital model persona around the network 120 to opportunistically test the network activity of the user 130 from various locations. For instance, if the user 130 plans to travel to another work site, the digital model persona may be duplicated at the new work site ahead of the arrival of the user 130 to test the availability of the network resources used by the user 130.

Figure 4A:
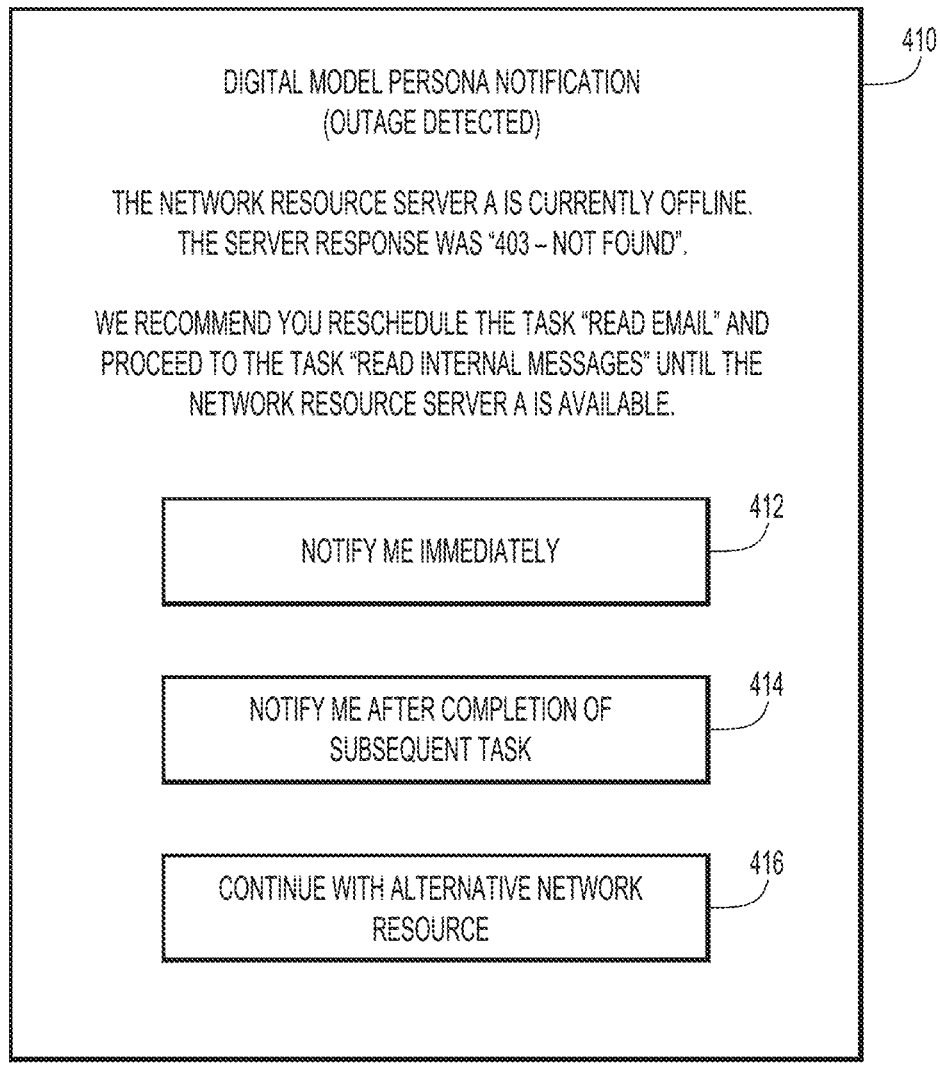
FIG. 4A illustrates a notification to a user when their digital model persona detects an outage of a network resource for a task scheduled to be performed by the user, according to an example embodiment.

Referring now to FIG. 4A, a simulated screenshot shows a notification 410 that the management server provides to a user device when the corresponding digital model persona detects that a network resource is unavailable before the user performs the associated task. The notification 410, which may be displayed to the user on their user device, includes information about the unavailability of the network resource. The notification 410 may also include a suggestion to reschedule the task that is associated with the unavailable network resource. The notification 410 includes buttons 412, 414, and 416 that enable the user to select how to handle the task with the unavailable resource.

The user may select the button 412, and direct the management server to monitor the status of the corresponding network resource and to notify the user device as soon as the network resource is available again. The user device may then interrupt whatever task the user is currently performing and notify the user that the network resource for the postponed task is now available and offer to switch to the previously postponed task.

The user may instead select the button 414, which indicates that the user does not want to interrupt a subsequent task to return to the postponed, and direct the management server to monitor the status of the network resource corresponding to the postponed task. In one example, the management server may notify the user device as soon as the corresponding network resource is available, but the user device may refrain from notifying the user until the subsequent task is completed. Alternatively, the management server may wait until the subsequent task is completed before notifying the user device that the network resource corresponding to the postponed task is available.

If an alternative network resource is available that may allow the user to perform the task corresponding to the network resource that is currently unavailable, then the user device may present the user with the button 416, which allows the user to proceed with the task using the alternative network resource. In one example, the alternative network resource may be a backup resource (e.g., an overnight backup of email messages) or a parallel network resource (e.g., an internal security server that processes copies of email messages).

Referring now to FIG. 4B, with reference back to the schedule shown in FIG. 2, a modified schedule is shown to illustrate the management server rescheduling a user task based on a failed pre-test of network resources by the digital model persona. When the digital model persona detects a failed pre-test 420 at 7:30 AM that indicates that one of the network resources is unavailable, then the corresponding task 230 originally scheduled for 8:00 AM is removed and rescheduled as a task 425 at 10:00 AM.

The management server may also cause the user device to shift user tasks and the corresponding pre-tests by the digital model persona earlier in the schedule based on the postponed task 425. The modified schedule shifts the task 240, which was scheduled for 9:00 AM on the original schedule 200, to the task 430 scheduled for 8:30 AM. Since the task 430 is shifted to an earlier time, the management server also shifts the corresponding pre-test 435 performed by the digital model persona to an earlier time (e.g., 8:00 AM) that precedes the rescheduled task 430.

Similarly, the modified schedule shifts the task 250, which was scheduled for 9:30 AM on the original schedule 200, to the task 440 scheduled for 9:00 AM. Since the task 440 is shifted to an earlier time, the management server also shifts the corresponding pre-test 445 performed by the digital model persona to an earlier time (e.g., 8:30 AM) that precedes the rescheduled task 440. In some instances, the management server may maintain one or more tasks, such as task 260, at the previously scheduled time. If the task 260 remains scheduled at the same time (e.g., 11:00 AM), then the management server maintains the corresponding pre-test 265 at the same time preceding the task 260.

Figure 5A:
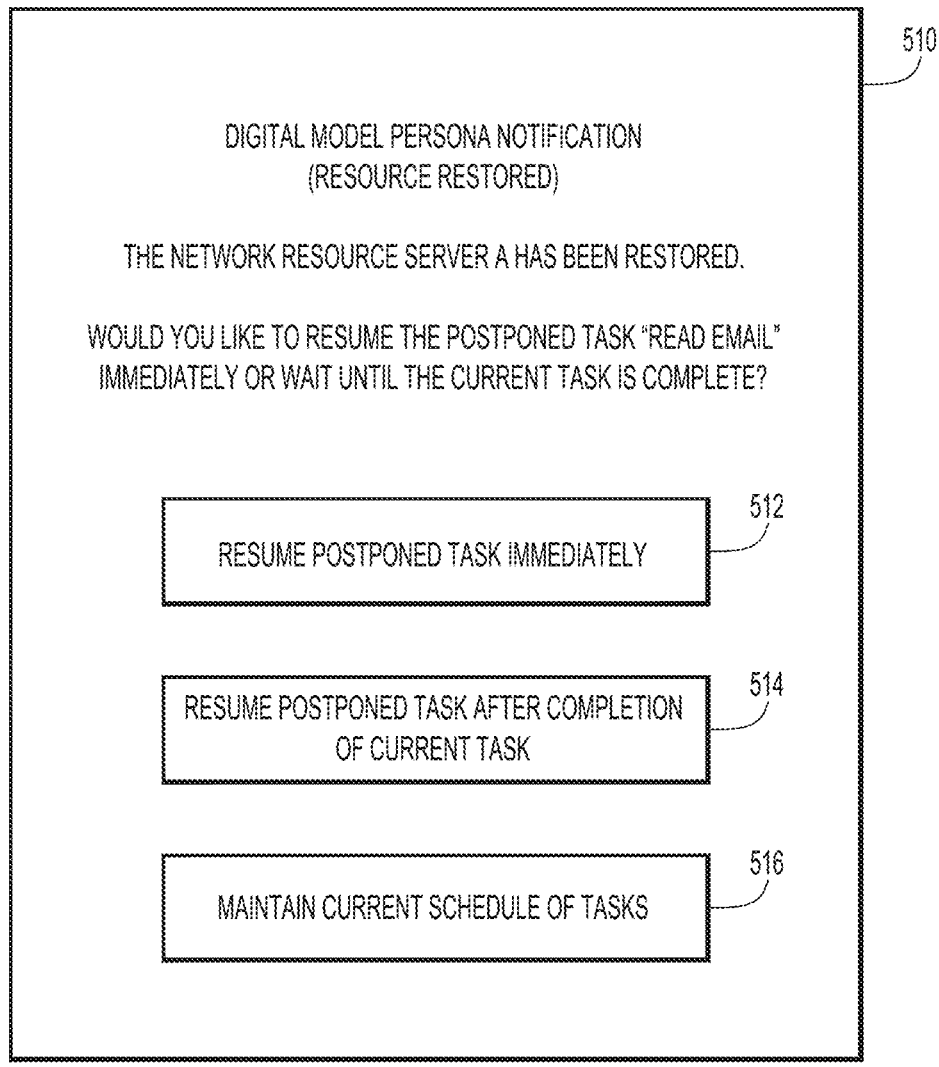
FIG. 5A illustrates a notification to a user when their digital model persona detects the resumed availability of a network resource for a rescheduled task, according to an example embodiment.

Referring now to FIG. 5A, a simulated screenshot shows a notification 510 that the management server provides to a user device when the corresponding digital model persona detects that the availability of a network resource has been restored. The notification 510, which may be displayed to the user on their user device, includes an indication that the network resource has been restored. The notification 510 may further indicate that a previously postponed task may now be performed. The notification 510 includes buttons 512, 514, and 516 that enable the user to select how to handle the postponed task now that the network resource is available.

The user may select button 512, and direct the user device to resume the postponed task immediately without waiting to complete any task that is currently in progress. The user may instead select button 514, and direct the user device to resume the postponed task after the completion of the current task. Alternatively, the user may select button 516, and direct the user device to maintain the rescheduled order of tasks, essentially ignoring the notification that the network resource for the postponed task has been restored.

In one example, the user device may only present the notification 510 with the button 512 to the user after the user has indicated that the user wishes to be notified immediately when the network resource is available. For instance, if the user selected button 414 as shown in FIG. 4A, then the user device may present the notification 510 after the completion of the current task. In this instance, the notification 510 may combine the button 512 and the button 514 since the current task has been completed and the postponed task may be resumed immediately.

Referring now to FIG. 5B, with continued reference to the schedule 200 shown in FIG. 2 and modified in FIG. 4B, an updated schedule after a previously unavailable network resource is restored. In this example, the user selects to resume the postponed task as soon as the current task is completed. When the digital model persona detects that the network resource is restored through a pre-test 520, the user is currently performing the task 440. The user device provides a notification to the user of the restored network resource, as shown in FIG. 5A, and the user selects to resume the postponed task after completing the task 440. The user device shifts the task 425 from 10:00 AM to a user 525 at 9:30 AM.

In one example, the scenarios presented in FIGS. 4A, 4B, 5A, and 5B that modify the original schedule 200 shown in FIG. 2 enable the digital model persona corresponding to a user to pre-test the network resources before the user would experience the outage directly. The digital model persona predicts the usage of network resources by the corresponding user and ensures that the network resources are operational, mitigating any frustration experienced by the user at the inability to follow their typical routine. When the digital model persona detects that a network resources (e.g., a server or database) is down, the digital model persona reschedules the impacted user tasks for the user, notifies the user of the unavailable network resource, and provides suggestions of how to handle the user task. Additionally, the digital model persona may continue to test the unavailable network resource to determine when the network resource is restored. After the network resource is restored the digital model persona may notify and reorder the user's schedule of tasks to resume any postponed user tasks that relied on the previously unavailable network resource.

Figure 6:
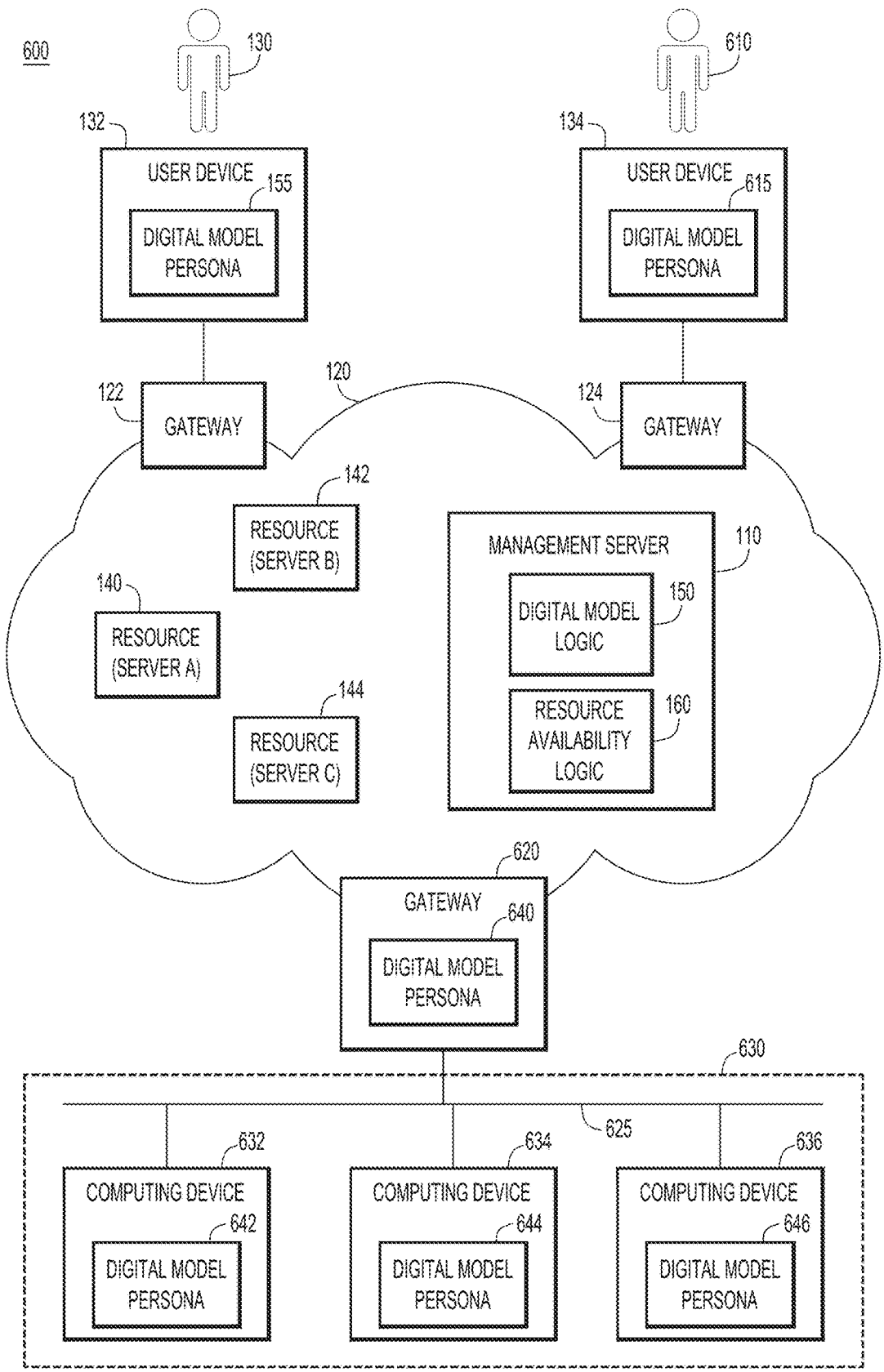
FIG. 6 is a simplified block diagram illustrating the use of digital model personas for service scale testing, according to an example embodiment.

Referring now to FIG. 6, a block diagram illustrates a network management system 600 that leverages digital model personas for service scale testing of a new network location. For instance, if an organization is expanding to a new physical location, the network management system leverages the digital model personas of existing users to pre-test the network at the new physical location. The system 600 includes a management server 110 that gathers information from user 130 and user 610 to generate digital model personas 155 and 615, respectively.

The system 600 expands the network 120 to include a gateway 620 to connects to a local network 625 at a physical location 630. In one example, the physical location 630 may be a new office building or campus for an organization. The physical location 630 includes computing devices 632, 634, and 636. In one example, the computing devices 632, 634, and/or 636 may be user devices or network devices.

The management server 110 installs and runs a digital model persona 640 in the gateway 620 to ensure that the network resources (e.g., network resources 140, 142, and 144) are available through the network 120 to reach the network 625 at the physical location 630. The management server 110 also installs and runs digital model personas 642, 644, and 646 in the computing devices 632, 634, and 636, respectively. In one example, the digital model personas 640, 642, 644, and/or 646 may be duplicates of digital model persona 155 or digital model persona 615.

By using the digital model personas generated from the network activity of users, such as user 130 and user 610, the system 600 may apply the digital model personas and assign the digital model personas to different parts of the network (e.g., network 625) to determine how the network would perform if the users were in that physical location 630. For instance, in a hybrid work environment, many employees have been hired at organizations without ever setting foot in the office building. Each employee may be doing unique job tasks accessing various services and placing different demands on the network resources.

The system 600 enables the organization to simulate the impact on the network 120 if all of those employees came into the office building at the same time. The management server 110 may place respective digital model personas of each employee at different locations of the network to validate load and performance before those employees come into the office.

In another example, digital model personas may be scaled up and multiplied to test scale of services on the network and applications. For instance, if a new resource is scheduled to be brought online, the digital model personas corresponding to users in the organization may be directed to access that new resource to evaluate how well the new resource handles the increased scale of use. Additionally, the management server may measure the impact of the new resource on the performance of the digital model personas. For instance, the new resource may provide faster access to a service than the previously available resource.

In a further example, if an organization plans to transition from one Software as a Service (SaaS) vendor to another, the new vendor may use the digital model personas of the employees for load testing. Additionally, the organization and the new vendor may measure the impact of the new SaaS application on the performance of the digital model personas as a proxy for the impact that the new SaaS application will have on the employees if the new SaaS system is implemented. For instance, the organization may measure whether the new SaaS application uses more processing/memory resources on the user devices than the current SaaS application. Additionally, the organization may measure any performance/speed improvements from implementing the new SaaS application before the human users interact with the new SaaS application.

Figure 7:
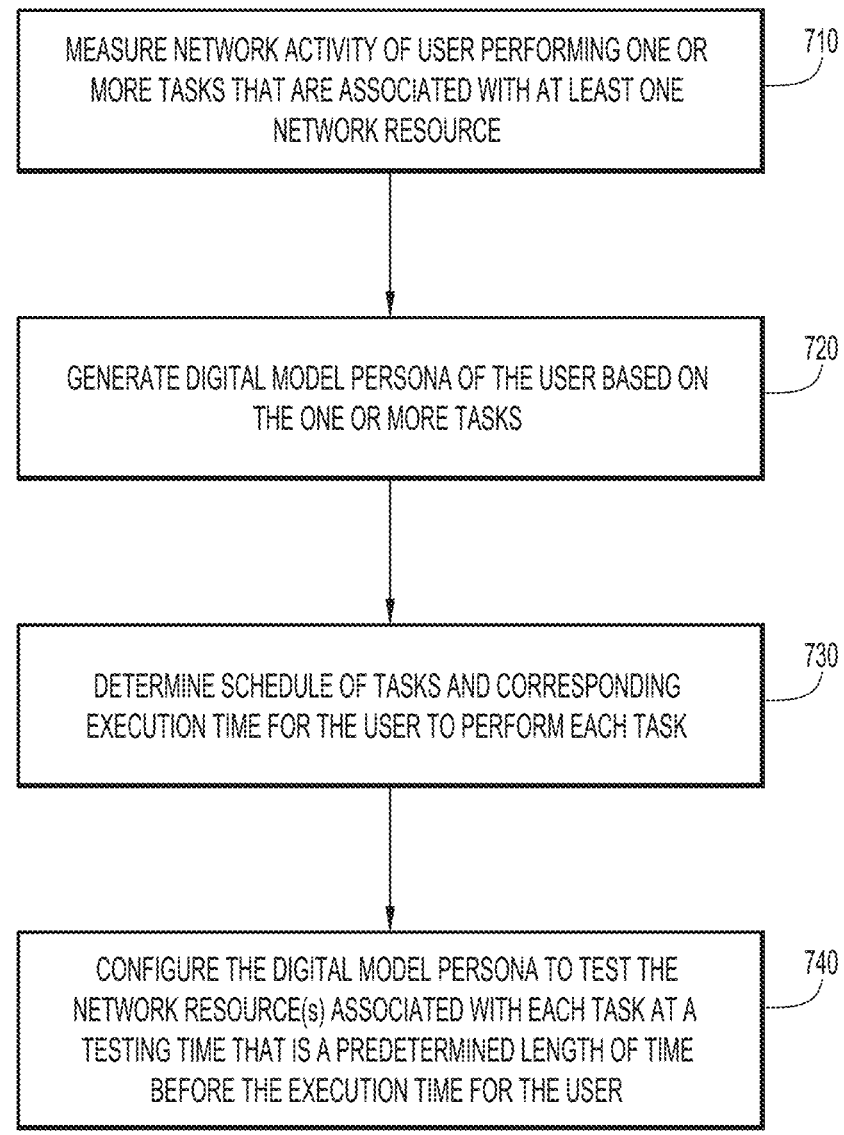
FIG. 7 is a flowchart illustrating operations performed by a management server to pre-test network resources with a digital model persona of a user, according to an example embodiment.

Referring now to FIG. 7, a flowchart illustrates an example process 700 performed by a management server (e.g., management server 110) to pre-test at least one network resource associated with a user task. At 710, the management server measures the network activity of a user performing one or more tasks. In one example, the network activity includes communication between a user device and at least one network resource associated with a corresponding task performed by the user.

At 720, the management server generates a digital model persona of the user based on the one or more tasks performed by the user. In one example, the digital model persona of the user is configured to replicate the network activity typically performed by the user device as the user performs each task. In another example, the digital model persona may be generated by a machine learning process that synthesizes a typical example of network activity by the user based on measured input of network activity over a predetermined length of time (e.g., days, weeks, or months). The digital model persona may be updated based on new network activity performed by the associated user.

At 730, the management server determines a schedule of the tasks performed by the user. In one example, each task performed by the user is associated with a corresponding execution time for the user. For instance, the management server may determine that the user typically performs a first task (e.g., reading email) at a first time (e.g., 8:00 AM), performs a second task (e.g., reviewing log files) at a second time (e.g., 9:30 AM), and performs a third task (e.g., accessing a code repository to write code modules) at a third time (e.g., 11:00 AM).

At 740, the management server configures the digital model persona of the user to test the at least one network resource associated with a corresponding task at a testing time that is a predetermined length of time (e.g., 15 minutes) prior to the execution time for the user. In one example, the digital model persona may be configured to test the availability of an email server at 7:45 AM, which is 15 minutes before 8:00 AM—the time indicated on the user's schedule when the user typically checks their email. In another example, the management server may configure the digital model persona to run on the user device associated with the user or on another device in the network, such as a gateway device through which the user device typically connects.

Figure 8:
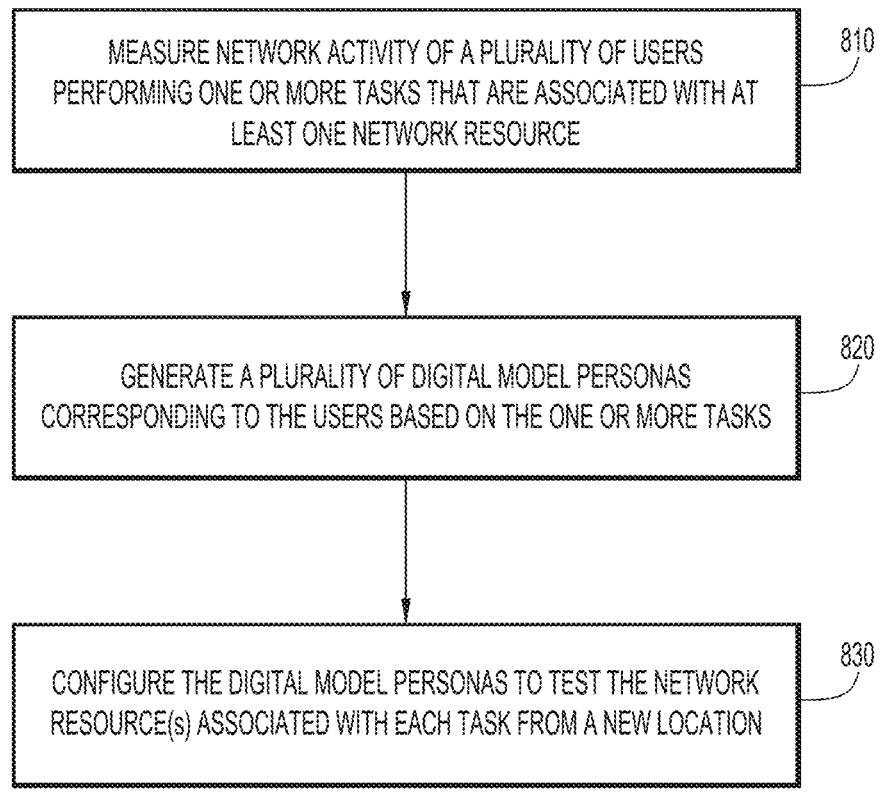
FIG. 8 is a flowchart illustrating operations performed by a management server for service scale testing of network resources with a plurality of digital model personas of users, according to an example embodiment.

Referring now to FIG. 8, a flowchart illustrates an example process 800 performed by a management server (e.g., management server 110) to leverage multiple digital model personas to pre-test network resources at scale before the associated human users perform the corresponding tasks. At 810, the management server measures the network activity of a plurality of users performing one or more tasks. In one example, the network activity includes communication between user devices and at least one network resource associated with a corresponding task performed by the user.

At 820, the management server generates a plurality of digital model personas corresponding to the users based on the tasks of the corresponding user. In one example, each user is associated with their own digital model persona, and each digital model persona is generated based on the network activity of the corresponding user.

At 830, the management server configures the digital model personas to test the at least one network resource associated with each task from a new location. In one example, the new location may be a new physical location or a new network location. For instance, the management server may configure the digital model personas to pre-test the network resources from a new office building into which an organization will expand. In another example, the management server may configure the digital model personas to test a new network configuration or a new network resource. For instance, the management server may configure the digital model personas to test a new SaaS application that may change the network resources available to the user devices without requiring each individual user to determine whether they are able to access the new network resource.

Figure 9:
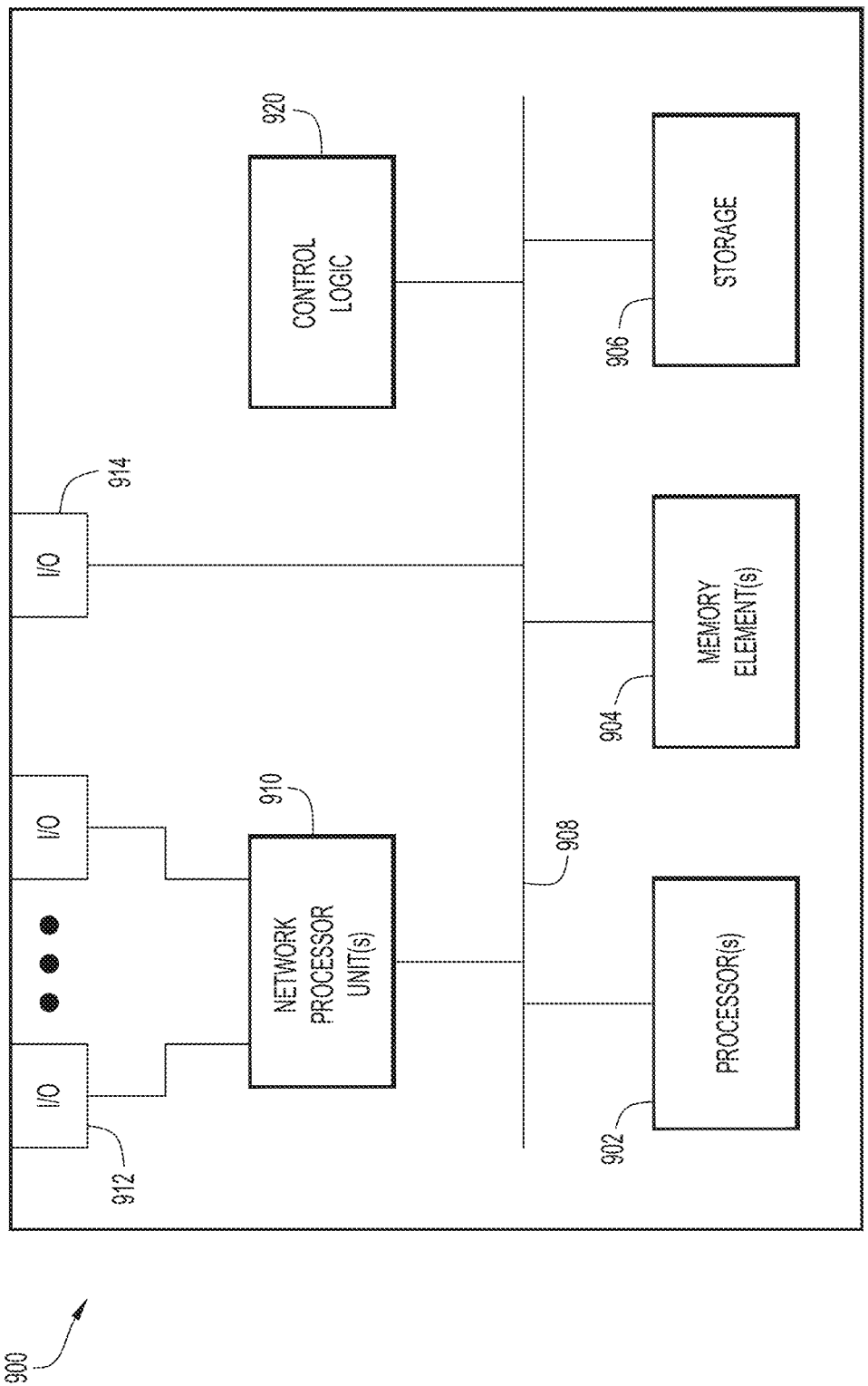
FIG. 9 is a block diagram of a computing device that may be configured to perform the techniques presented herein, according to an example embodiment.

Referring to FIG. 9, FIG. 9 illustrates a hardware block diagram of a computing device 900 that may perform functions associated with operations discussed herein in connection with the techniques depicted in FIGS. 1-3, 4A, 4B, 5A, 5B, and 6-8. In various embodiments, a computing device, such as computing device 900 or any combination of computing devices 900, may be configured as any entity/entities as discussed for the techniques depicted in connection with FIGS. 1-3, 4A, 4B, 5A, 5B, and 6-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, the techniques presented herein leverage digital model personas of human users to pre-test the tasks that the users will perform before the users actually perform them. The digital model personas validate that the network resources are available to enable the user's tasks to succeed when the user performs each task. The digital model persona may be run from the user's own device, from the user's gateway into the network, or from anywhere in the network in order to simulate the actions of the human user on the network. If the pre-test run by a digital model persona fails, indicating that the associated network resource is unavailable, the system may notify the human user to re-order their typical schedule of tasks so they do not lose productivity. The digital model persona may continue to track the availability of the network resource and notify the human user when the network resource is available again so the human user can resume a postponed task.

The techniques presented herein provide a mechanism to predict future network issues of human users based on actions of digital model personas that model the actions of a corresponding human user. The mechanism involves testing network actions using the digital model persona shortly before the human user would have performed a task, and notifying the human user of issues with performing the network action. The system alerts the human user to the predicted issue with their upcoming task, and indicates the issue that would prevent the human user from completing the task. The system proactively reschedules the human user's work schedule to accommodate the issue that was detected by the digital model persona. The digital model persona may be deployed on various computing devices, including the a user device, the network gateway for the user device, or other devices with access to the network.

Additionally, the techniques presented herein provide for a method to aggregate the experience of multiple digital model personas and simulate how the network resources would handle an expansion of the work force or a significant shift in workforce activity. The system may test the potential success of large meetings or group activities using digital model personas to simulate the scale of the increase in network activity. Furthermore, the system may test the potential success of switching a common activity to use a new service.

In some aspects, the techniques described herein relate to a method including: measuring network activity of a user performing one or more tasks, the network activity including communication between a user device of the user and at least one network resource associated with a corresponding task of the one or more tasks performed by the user; generating a digital model persona of the user based on the one or more tasks performed by the user; determining a schedule of the one or more tasks performed the user, wherein each particular task of the one or more tasks is associated with a corresponding execution time for the user; and configuring the digital model persona to test the at least one network resource associated with the corresponding task at a testing time that is a predetermined length of time prior to the corresponding execution time for the user.

In some aspects, the techniques described herein relate to a method, further including: determining that the at least one network resource associated with the corresponding task is unavailable; and sending a notification to the user device, the notification indicating that the at least one network resource is unavailable.

In some aspects, the techniques described herein relate to a method, further including sending a prompt to the user device to reschedule the corresponding task to a later time.

In some aspects, the techniques described herein relate to a method, further including: detecting that the at least one network resource associated with the corresponding task is available before the later time; and sending another notification to the user device indicating that the at least one network resource associated with the corresponding task is available.

In some aspects, the techniques described herein relate to a method, wherein the digital model persona associates a corresponding network location for each of the one or more tasks performed by the user, the method further including determining whether the user device is at the corresponding network location at the testing time.

In some aspects, the techniques described herein relate to a method, further including, responsive to a determination that the user device is at the corresponding network location at the testing time, configuring the digital model persona to test the at least one network resource from the user device.

In some aspects, the techniques described herein relate to a method, further including, responsive to a determination that the user device is not at the corresponding network location at the testing time, configuring the digital model persona to test the at least one network resource from a neighboring network location, wherein the neighboring network location is along a path between the corresponding network location and the at least one network resource.

In some aspects, the techniques described herein relate to a method, further including: generating a plurality of digital model personas corresponding to a plurality of users; and configuring the plurality of digital model personas to test the at least one network resource.

In some aspects, the techniques described herein relate to a method, wherein the plurality of digital model personas test the at least one network resource from a location that is different than a location of the user device.

In some aspects, the techniques described herein relate to a method, further including determining a performance of the at least one network resource based on a test conducted by the plurality of digital model personas.

In some aspects, the techniques described herein relate to an apparatus including: a network interface configured to communicate with computing devices in a computer network; and a processor coupled to the network interface, the processor configured to: measure network activity of a user performing one or more tasks, the network activity including communication between a user device of the user and at least one network resource associated with a corresponding task of the one or more tasks performed by the user; generate a digital model persona of the user based on the one or more tasks performed by the user; determine a schedule of the one or more tasks performed the user, wherein each particular task of the one or more tasks is associated with a corresponding execution time for the user; and configure the digital model persona to test the at least one network resource associated with the corresponding task at a testing time that is a predetermined length of time prior to the corresponding execution time for the user.

In some aspects, the techniques described herein relate to an apparatus, wherein the processor is further configured to: determine that the at least one network resource associated with the corresponding task is unavailable; and cause the network interface to send a notification to the user device, the notification indicating that the at least one network resource is unavailable.

In some aspects, the techniques described herein relate to an apparatus, wherein the processor is further configured to cause the network interface to send a prompt to the user device to reschedule the corresponding task to a later time.

In some aspects, the techniques described herein relate to an apparatus, wherein the processor is further configured to: detect that the at least one network resource associated with the corresponding task is available before the later time; and cause the network interface to send another notification to the user device indicating that the at least one network resource associated with the corresponding task is available.

In some aspects, the techniques described herein relate to an apparatus, wherein the digital model persona associates a corresponding network location for each of the one or more tasks performed by the user, and wherein the processor is further configured to: determine whether the user device is at the corresponding network location at the testing time; and responsive to a determination that the user device is not at the corresponding network location at the testing time, configure the digital model persona to test the at least one network resource from a neighboring network location, wherein the neighboring network location is along a path between the corresponding network location and the at least one network resource.

In some aspects, the techniques described herein relate to one or more non-transitory computer readable storage media encoded with software including computer executable instructions that, when the software is executed on a computing device, is operable to cause a processor of the computing device to: measure network activity of a user performing one or more tasks, the network activity including communication between a user device of the user and at least one network resource associated with a corresponding task of the one or more tasks performed by the user; generate a digital model persona of the user based on the one or more tasks performed by the user; determine a schedule of the one or more tasks performed the user, wherein each particular task of the one or more tasks is associated with a corresponding execution time for the user; and configure the digital model persona to test the at least one network resource associated with the corresponding task at a testing time that is a predetermined length of time prior to the corresponding execution time for the user.

[ooloo] In some aspects, the techniques described herein relate to one or more non-transitory computer readable storage media, wherein the software is further operable to cause the processor to: determine that the at least one network resource associated with the corresponding task is unavailable; and send a notification to the user device, the notification indicating that the at least one network resource is unavailable.

In some aspects, the techniques described herein relate to one or more non-transitory computer readable storage media, wherein the software is further operable to cause the processor to send a prompt to the user device to reschedule the corresponding task to a later time.

In some aspects, the techniques described herein relate to one or more non-transitory computer readable storage media, wherein the software is further operable to cause the processor to: detect that the at least one network resource associated with the corresponding task is available before the later time; and send another notification to the user device indicating that the at least one network resource associated with the corresponding task is available.

In some aspects, the techniques described herein relate to one or more non-transitory computer readable storage media, wherein the digital model persona associates a corresponding network location for each of the one or more tasks performed by the user, and wherein the software is further operable to cause the processor to: determine whether the user device is at the corresponding network location at the testing time; and responsive to a determination that the user device is not at the corresponding network location at the testing time, configure the digital model persona to test the at least one network resource from a neighboring network location, wherein the neighboring network location is along a path between the corresponding network location and the at least one network resource.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
measuring network activity of a user performing a plurality of tasks, the network activity including communication between a user device of the user and at least one network resource associated with a corresponding task of the plurality of tasks performed by the user;
generating a digital model persona of the user based on the plurality of tasks performed by the user, wherein the digital model persona is configured to mimic the plurality of tasks performed by the user, and wherein the digital model persona associates a corresponding network location for each of the plurality of tasks performed by the user;
determining a schedule of the plurality of tasks performed the user, wherein each particular task of the plurality of tasks is associated with a corresponding execution time for the user;
configuring the digital model persona to test the at least one network resource associated with the corresponding task at a testing time that is a predetermined length of time prior to the corresponding execution time for the user, wherein the testing time varies between the plurality of tasks;
determining whether the user device is at the corresponding network location at the testing time; and
responsive to a determination that the user device is not at the corresponding network location at the testing time, configuring the digital model persona to test the at least one network resource from a neighboring network location, wherein the neighboring network location is along a path between the corresponding network location and the at least one network resource.

2. The method of claim 1, further comprising:
determining that the at least one network resource associated with the corresponding task is unavailable; and
sending a notification to the user device, the notification indicating that the at least one network resource is unavailable.

3. The method of claim 2, further comprising sending a prompt to the user device to reschedule the corresponding task to a later time.

4. The method of claim 3, further comprising:
detecting that the at least one network resource associated with the corresponding task is available before the later time; and sending another notification to the user device indicating that the at least one network resource associated with the corresponding task is available.

5. The method of claim 1, further comprising, responsive to a determination that the user device is at the corresponding network location at the testing time, configuring the digital model persona to test the at least one network resource from the user device.

6. The method of claim 1, further comprising:
determining that the at least one network resource associated with the corresponding task is unavailable; and
responsive to a determination that the at least one network resource is unavailable, providing a suggestion to the user about when or how to perform the corresponding task.

7. The method of claim 1, further comprising:
monitoring availability of the at least one network resource prior to the user accessing the at least one network resource; and
performing one or more pre-tests of the digital model persona.

8. An apparatus comprising:
a network interface configured to communicate with computing devices in a computer network; and
a processor coupled to the network interface, the processor configured to:
measure network activity of a user performing a plurality of tasks, the network activity including communication between a user device of the user and at least one network resource associated with a corresponding task of the plurality of tasks performed by the user;
generate a digital model persona of the user based on the plurality of tasks performed by the user, wherein the digital model persona is configured to mimic the plurality of tasks performed by the user, and wherein the digital model persona associates a corresponding network location for each of the plurality of tasks performed by the user;
determine a schedule of the plurality of tasks performed the user, wherein each particular task of the plurality of tasks is associated with a corresponding execution time for the user;
configure the digital model persona to test the at least one network resource associated with the corresponding task at a testing time that is a predetermined length of time prior to the corresponding execution time for the user, wherein the testing time varies between the plurality of tasks;
determine whether the user device is at the corresponding network location at the testing time; and
responsive to a determination that the user device is not at the corresponding network location at the testing time, configure the digital model persona to test the at least one network resource from a neighboring network location, wherein the neighboring network location is along a path between the corresponding network location and the at least one network resource.

9. The apparatus of claim 8, wherein the processor is further configured to:
determine that the at least one network resource associated with the corresponding task is unavailable; and
cause the network interface to send a notification to the user device, the notification indicating that the at least one network resource is unavailable.

10. The apparatus of claim 9, wherein the processor is further configured to cause the network interface to send a prompt to the user device to reschedule the corresponding task to a later time.

11. The apparatus of claim 10, wherein the processor is further configured to:
detect that the at least one network resource associated with the corresponding task is available before the later time; and
cause the network interface to send another notification to the user device indicating that the at least one network resource associated with the corresponding task is available.

12. The apparatus of claim 8, wherein responsive to a determination that the user device is at the corresponding network location at the testing time, the processor is further configured to configure the digital model persona to test the at least one network resource from the user device.

13. The apparatus of claim 8, wherein the processor is further configured to:
determine that the at least one network resource associated with the corresponding task is unavailable; and
responsive to a determination that the at least one network resource is unavailable, provide a suggestion to the user about when or how to perform the corresponding task.

14. The apparatus of claim 8, wherein the processor is further configured to:
monitor availability of the at least one network resource prior to the user accessing the at least one network resource; and
perform one or more pre-tests of the digital model persona.

15. One or more non-transitory computer readable storage media encoded with software comprising computer executable instructions that, when the software is executed on a computing device, is operable to cause a processor of the computing device to:
measure network activity of a user performing a plurality of tasks, the network activity including communication between a user device of the user and at least one network resource associated with a corresponding task of the plurality of tasks performed by the user;
generate a digital model persona of the user based on the plurality of tasks performed by the user, wherein the digital model persona is configured to mimic the plurality of tasks performed by the user, and wherein the digital model persona associates a corresponding network location for each of the plurality of tasks performed by the user;
determine a schedule of the plurality of tasks performed the user, wherein each particular task of the plurality of tasks is associated with a corresponding execution time for the user;
configure the digital model persona to test the at least one network resource associated with the corresponding task at a testing time that is a predetermined length of time prior to the corresponding execution time for the user, wherein the testing time varies between the plurality of tasks;
determine whether the user device is at the corresponding network location at the testing time; and
responsive to a determination that the user device is not at the corresponding network location at the testing time, configure the digital model persona to test the at least one network resource from a neighboring network location, wherein the neighboring network location is along a path between the corresponding network location and the at least one network resource.

16. The one or more non-transitory computer readable storage media of claim 15, wherein the software is further operable to cause the processor to:
   determine that the at least one network resource associated with the corresponding task is unavailable; and
   send a notification to the user device, the notification indicating that the at least one network resource is unavailable.

17. The one or more non-transitory computer readable storage media of claim 16, wherein the software is further operable to cause the processor to send a prompt to the user device to reschedule the corresponding task to a later time.

18. The one or more non-transitory computer readable storage media of claim 17, wherein the software is further operable to cause the processor to:
   detect that the at least one network resource associated with the corresponding task is available before the later time; and
   send another notification to the user device indicating that the at least one network resource associated with the corresponding task is available.

19. The one or more non-transitory computer readable storage media of claim 15, wherein the digital model persona associates a corresponding network location for each of the plurality of tasks performed by the user, and wherein the software is further operable to cause the processor to:
   determine whether the user device is at the corresponding network location at the testing time; and
   responsive to a determination that the user device is at the corresponding network location at the testing time, configure the digital model persona to test the at least one network resource from the user device.

20. The one or more non-transitory computer readable storage media of claim 15, wherein the software is further operable to cause the processor to:
   determine that the at least one network resource associated with the corresponding task is unavailable; and
   responsive to a determination that the at least one network resource is unavailable, provide a suggestion to the user about when or how to perform the corresponding task.

* * * * *